US012679704B2

(12) United States Patent
Yu et al.

(10) Patent No.: US 12,679,704 B2
(45) Date of Patent: Jul. 14, 2026

(54) PLUG-IN ROPE GUIDE PROTECTIVE SHELL

(71) Applicant: T-MAX (HANGZHOU) TECHNOLOGY CO., LTD., Hangzhou (CN)

(72) Inventors: Hangfei Yu, Hangzhou (CN); Taotao Li, Hangzhou (CN)

(73) Assignee: T-MAX (HANGZHOU) TECHNOLOGY, CO., LTD., Zhejiang (CN)

( * ) Notice: Subject to any disclaimer, the term of this patent is extended or adjusted under 35 U.S.C. 154(b) by 294 days.

(21) Appl. No.: 18/644,584

(22) Filed: Apr. 24, 2024

(65) Prior Publication Data

US 2024/0351830 A1 Oct. 24, 2024

(30) Foreign Application Priority Data

Apr. 24, 2023 (CN) ........................ 202320958130.0

(51) Int. Cl.
*B66D 1/36* (2006.01)

(52) U.S. Cl.
CPC ..................................... *B66D 1/36* (2013.01)

(58) Field of Classification Search
CPC ... B66D 1/28; B66D 1/30; B66D 1/36; B66D 3/26; B66D 2700/0191; B63B 21/10; B63B 21/14; B63B 21/16; B60R 19/48
See application file for complete search history.

(56) References Cited

U.S. PATENT DOCUMENTS 1,386,052 A 8/1921 Duggan
1,945,702 A 2/1934 Pitter
2,090,445 A 8/1937 Hale et al.
2,418,105 A * 3/1947 Wohler .................... F16L 5/00 242/157 R
4,103,872 A 8/1978 Hirasuka
4,127,295 A * 11/1978 Robinson ................ B66D 1/00 254/362

(Continued)

FOREIGN PATENT DOCUMENTS

CH 597010 A5 3/1978
CN 203728468 U 2/2014

(Continued)

OTHER PUBLICATIONS

Non-Final Office Action for U.S. Appl. No. 18/515,041, mailed on Oct. 1, 2025, 7 pages.

(Continued)

*Primary Examiner* — William A. Rivera
*Assistant Examiner* — Henrix Soto
(74) *Attorney, Agent, or Firm* — Perkins Coie LLP

(57) ABSTRACT

Disclosed are devices, systems, and methods for a rope guide and, in particular, a plug-in rope guide protective shell. In some embodiments, a plug-in rope guide protective shell includes a shell body and a plug-in member. The shell body has an inner cavity for accommodating a rope guide, and the rope guide has a guide opening penetrating through the rope guide along a first direction. The plug-in member is connected with the shell body and located in the inner cavity of the shell body. The plug-in member can be inserted into the guide opening.

10 Claims, 4 Drawing Sheets

(56) References Cited

U.S. PATENT DOCUMENTS

| | | | | | |
|---|---|---|---|---|---|
| 5,048,854 | A | | 9/1991 | Clark | |
| 5,056,698 | A | * | 10/1991 | Kozakevich | B60R 13/105 242/398 |
| 5,255,767 | A | | 10/1993 | Norwood | |
| 5,663,541 | A | | 9/1997 | McGregor, II | |
| 6,050,290 | A | | 4/2000 | Zhan | |
| 6,681,507 | B1 | * | 1/2004 | Lieziert | G09F 21/04 40/200 |
| 7,617,840 | B1 | | 11/2009 | Zinda | |
| 8,267,379 | B2 | | 9/2012 | Yang et al. | |
| 8,469,305 | B2 | | 6/2013 | Feldstein et al. | |
| 8,973,902 | B2 | | 3/2015 | Huang | |
| 9,388,025 | B2 | | 7/2016 | Costa | |
| 10,093,522 | B1 | | 10/2018 | Baugh | |
| 10,519,012 | B1 | | 12/2019 | Hare | |
| 10,562,743 | B2 | * | 2/2020 | Fretz | B63B 21/10 |
| 10,597,267 | B2 | * | 3/2020 | Hall | B66D 1/36 |
| D901,821 | S | | 11/2020 | Zheng | |
| 11,155,450 | B2 | | 10/2021 | Fan et al. | |
| 11,485,180 | B2 | | 11/2022 | Najarro | |
| 11,713,223 | B2 | | 8/2023 | Zhan et al. | |
| 11,965,288 | B2 | | 4/2024 | De Jager et al. | |
| 12,319,549 | B1 | | 6/2025 | Liu et al. | |
| D1,094,204 | S | | 9/2025 | Yu et al. | |
| 2006/0054731 | A1 | | 3/2006 | Nagler | |
| 2007/0267148 | A1 | | 11/2007 | Steele et al. | |
| 2008/0164364 | A1 | | 7/2008 | Kaltman | |
| 2011/0065546 | A1 | | 3/2011 | Xie et al. | |
| 2015/0203325 | A1 | | 7/2015 | Briggs et al. | |
| 2015/0298935 | A1 | | 10/2015 | Langeman | |
| 2016/0016766 | A1 | | 1/2016 | Ho | |
| 2016/0158584 | A1 | | 6/2016 | Burke et al. | |
| 2017/0321851 | A1 | | 11/2017 | Fretz et al. | |
| 2018/0118530 | A1 | | 5/2018 | August | |
| 2018/0215591 | A1 | | 8/2018 | Anderson | |
| 2019/0292026 | A1 | | 9/2019 | Felps | |
| 2019/0300344 | A1 | | 10/2019 | Cui | |
| 2020/0277169 | A1 | | 9/2020 | Zhan | |
| 2020/0299116 | A1 | | 9/2020 | Fan | |
| 2021/0155321 | A1 | | 5/2021 | Elliott | |
| 2022/0009756 | A1 | | 1/2022 | Fan et al. | |
| 2022/0178074 | A1 | | 6/2022 | Pavel | |
| 2023/0024630 | A1 | | 1/2023 | Kennelly | |
| 2024/0083378 | A1 | | 3/2024 | Anderson et al. | |
| 2024/0166152 | A1 | | 5/2024 | Zhang et al. | |
| 2024/0351830 | A1 | | 10/2024 | Yu et al. | |
| 2024/0351831 | A1 | | 10/2024 | Yu et al. | |

FOREIGN PATENT DOCUMENTS

| | | | | | |
|---|---|---|---|---|---|
| CN | 104925691 | A | | 9/2015 | |
| CN | 206188291 | U | | 5/2017 | |
| CN | 206188292 | U | | 5/2017 | |
| CN | 206606959 | U | | 11/2017 | |
| CN | 107601333 | A | | 1/2018 | |
| CN | 207361653 | U | | 5/2018 | |
| CN | 207537039 | U | | 6/2018 | |
| CN | 208037900 | U | | 11/2018 | |
| CN | 208532082 | U | | 2/2019 | |
| CN | 109625175 | A | * | 4/2019 | B63B 21/10 |
| CN | 209291854 | U | * | 8/2019 | |
| CN | 210286571 | U | | 4/2020 | |
| CN | 112645208 | A | | 4/2021 | |
| DE | 10300960 | A1 | | 7/2004 | |
| DE | 102007044287 | A | | 3/2009 | |
| GB | 2328919 | A | | 3/1999 | |
| GB | 2566315 | A | | 3/2019 | |
| KR | 20120041329 | A | * | 5/2012 | B63B 21/10 |
| KR | 20150001180 | U | * | 3/2015 | B63B 21/10 |
| KR | 20150025398 | A | * | 3/2015 | B63B 21/14 |
| KR | 101719102 | B1 | | 3/2017 | |
| WO | 2015013790 | A1 | | 2/2015 | |
| WO | 2018110886 | A1 | | 6/2018 | |
| WO | WO-2020218701 | A1 | * | 10/2020 | B63B 21/10 |
| WO | WO-2022108028 | A1 | * | 5/2022 | B63B 21/10 |

OTHER PUBLICATIONS

Non-Final Office Action for U.S. Appl. No. 18/645,223, mailed on Sep. 17, 2025, 9 pages.

Non-Final Office Action for U.S. Appl. No. 18/775,958, mailed on Jan. 23, 2026, 11 pages.

International Search Report of the International Searching Authority for PCT International Application No. PCT/CN2019/077842 mailed Oct. 12, 2019, 13 pages with English translation.

U.S. Appl. No. 16/742,632 Notice of Allowance Mailed Jun. 29, 2021, pp. 1-7.

U.S. Appl. No. 16/737,667, Restriction Requirement Mailed Mar. 21, 2022, pp. 1-6.

U.S. Appl. No. 18/335,980 Non-Final Office Action Mailed Jan. 23, 2024, pp. 1-11.

U.S. Appl. No. 18/335,993, Non-Final Office Action Mailed Jan. 30, 2024, pp. 1-11.

U.S. Appl. No. 17/484,950, Non-Final Office Action mailed Feb. 21, 2024, pp. 1-12.

Chinese Application No. 201910149808.9 Office Action Mailed Dec. 1, 2023, with English Translation, pp. 1-18.

Chinese Application No. 201910149845.X, Office Action mailed Jan. 2, 2024, with English Translation, pp. 1-10.

U.S. Appl. No. 18/335,980, Notice of Allowance mailed Jun. 6, 2024, pp. 8.

U.S. Appl. No. 18/335,993, Notice of Allowance Mailed May 15, 2024, pp. 1-8.

* cited by examiner

PLUG-IN ROPE GUIDE PROTECTIVE SHELL

CROSS-REFERENCE TO RELATED APPLICATIONS

This patent document claims priority to and benefits of Chinese Patent Application No. 202320958130.0, filed on Apr. 24, 2023. The entire contents of the aforementioned patent document are incorporated by reference for all purposes.

TECHNICAL FIELD

This patent document relates to rope guide equipment and, in particular, to a plug-in rope guide protective shell.

BACKGROUND

Automobile winches are mainly used for off-road vehicles, agricultural vehicles, ATV sport vehicles, yachts, and other special vehicles. They are self-protection and traction devices for vehicles and ships. The automobile winch has a rope guide for guiding and winding a strand rope onto a reel or a drum. In the related art, a protective shell is mounted on the rope guide through a bolt connection or adhesive connection to protect the rope guide. However, the adhesive connection has poor stability, which tends to cause the protective shell to fall off, and the bolt connection has the problem of inconvenient mounting and detachment of the protective shell.

SUMMARY

In some aspects, a plug-in rope guide protective shell, according to embodiments of the present technology, includes a shell body having an inner cavity for accommodating a rope guide, the rope guide having a guide opening penetrating the rope guide in a first direction, and a plug-in member connected to the shell body and arranged in the inner cavity of the shell body, the plug-in member being configured to be inserted in the guide opening.

The subject matter described in this patent document can be implemented in specific ways that provide one or more of the following features.

DETAILED DESCRIPTION

Embodiments of the present technology are described in detail below, and examples of the embodiments are shown in the accompanying drawings. The embodiments described below, by referring to the accompanying drawings, are exemplary and are intended to explain the present technology but cannot be interpreted as limitations to the present technology.

Hereinafter, referring to FIGS. 1 to 4, a plug-in rope guide protective shell according to embodiments of the present technology will be described.

As shown in FIGS. 1 to 4, the plug-in rope guide protective shell in the embodiments of the present technology includes a shell body 1 and a plug-in member 3.

Figure 1:
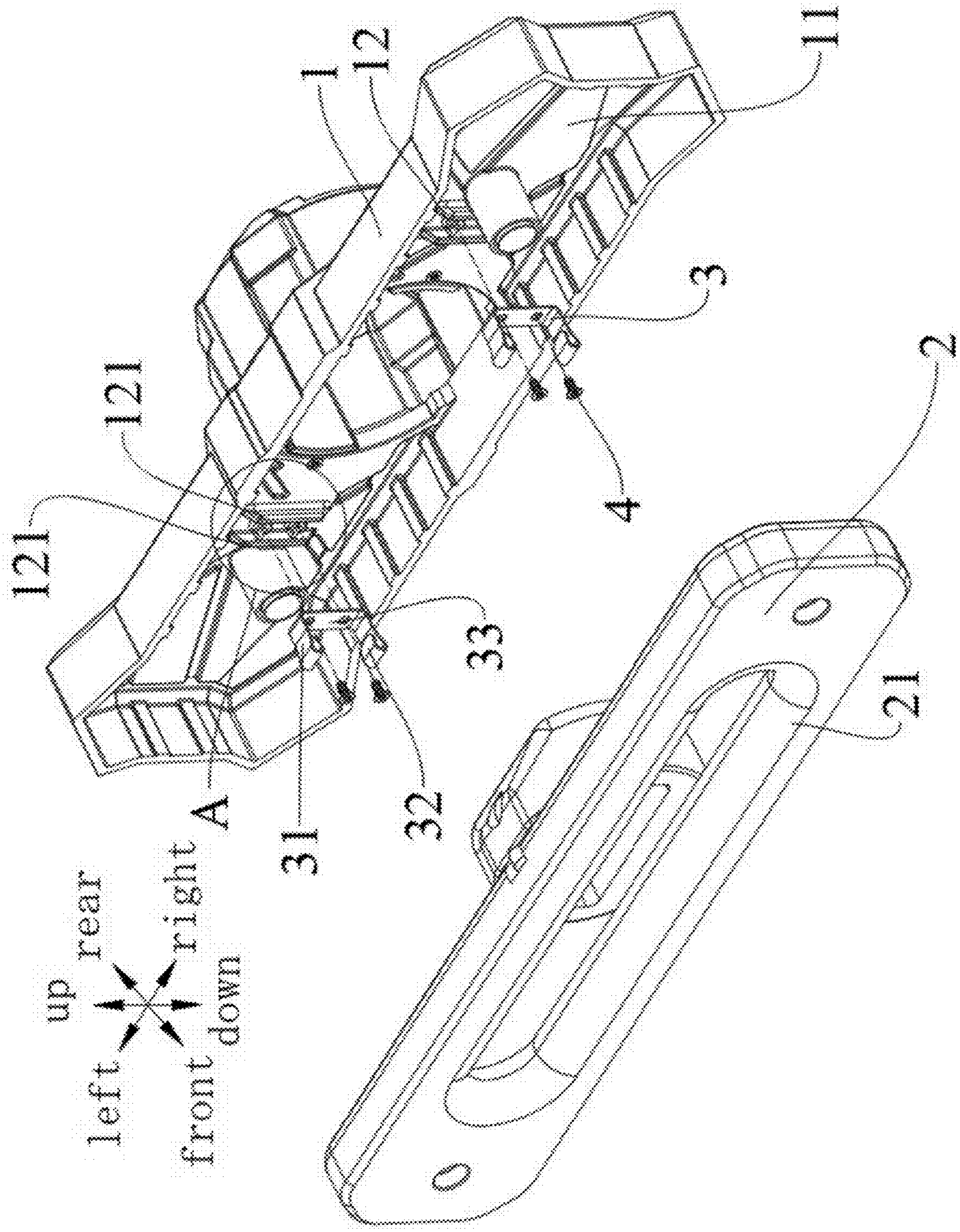
FIG. 1 is an exploded view of a plug-in rope guide protective shell according to some embodiments of the present technology.

The shell body 1 has an inner cavity 11 for accommodating a rope guide 2, and the rope guide 2 has a guide opening 21 penetrating through the rope guide 2 in a first direction (a front-rear direction, as shown in FIG. 1). The plug-in member 3 is connected to the shell body 1, is located in the inner cavity 11 of the shell body 1, and may be inserted or plugged into the guide opening 21.

As shown in FIGS. 1 to 4, a front end face of the shell body 1 has a recess extending backwards, and the recess forms the inner cavity 11 for accommodating the rope guide 2. The rope guide 2 is an annular frame, the annular frame encloses and defines the guide opening 21 that runs through the rope guide 2 in the front-rear direction, and the guide opening 21 is configured to be passed through by a strand rope so as to guide the strand rope. The plug-in member 3 is located in the inner cavity 11 and connected with an inner wall surface of the shell body 1. In other words, the plug-in member 3 is arranged on a bottom surface of the recess. When the rope guide 2 enters or exits the inner cavity 11, the plug-in member 3 may be inserted into or detached from the guide opening 21. When the rope guide 2 is located in the inner cavity 11, the plug-in member 3 is inserted in the guide opening 21 to connect the shell body 1 with the rope guide 2 so that the rope guide 2 is connected with the plug-in rope guide protective shell in a plug-in manner.

In the plug-in rope guide protective shell of the embodiments of the present technology, the plug-in member is arranged on the shell body, and the shell body is connected with the rope guide through the plug-in member in the plug-in manner so that the plug-in rope guide protective shell and the rope guide have the strong connection stability and it is convenient to mount and detach the plug-in rope guide protective shell.

In some embodiments, the rope guide 2 has a first abutting surface 22 and a second abutting surface 23 spaced apart in a second direction (an up-down direction, as shown in FIG. 1), the second direction is orthogonal to the first direction, and at least part of the guide opening 21 is located between the first abutting surface 22 and the second abutting surface 23.

Figure 2:
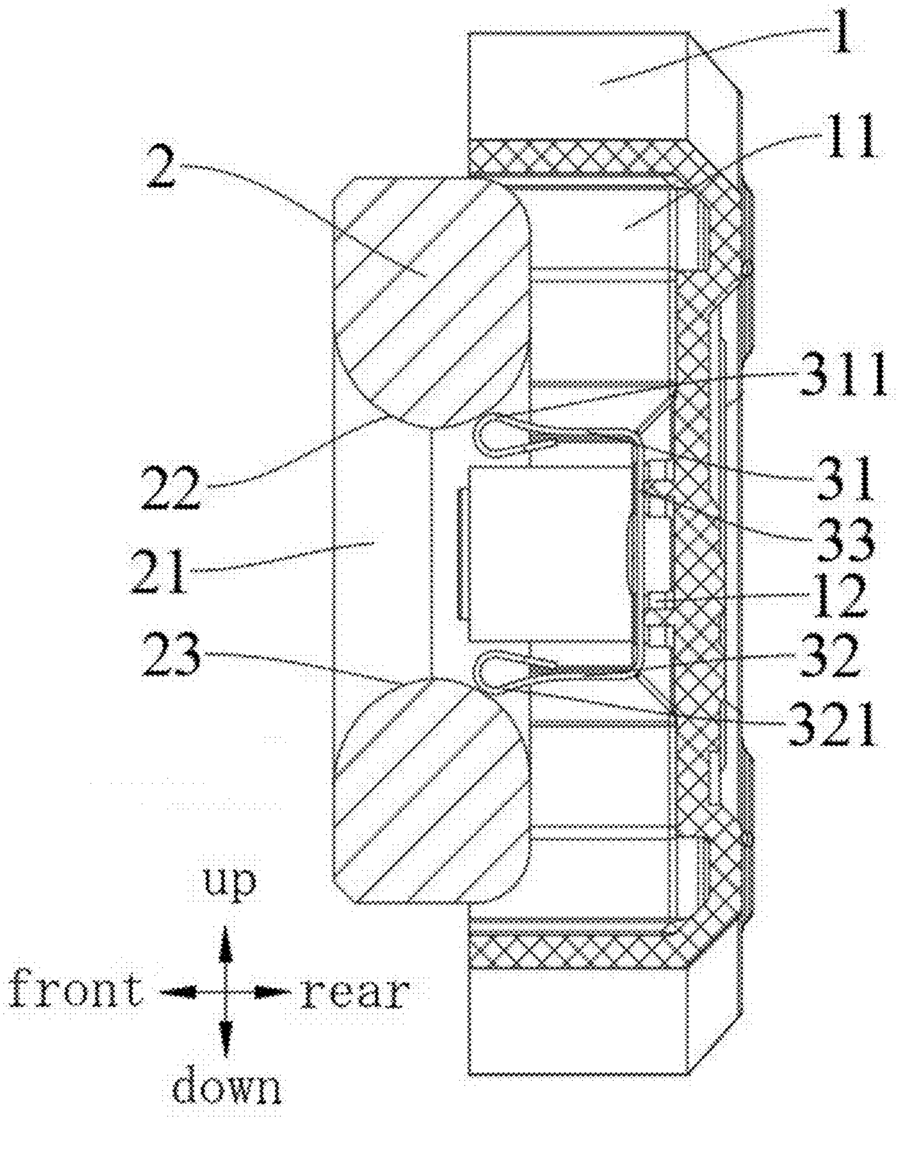
FIG. 2 is a first sectional view of a plug-in rope guide protective shell according to some embodiments of the present technology.
Figure 3:
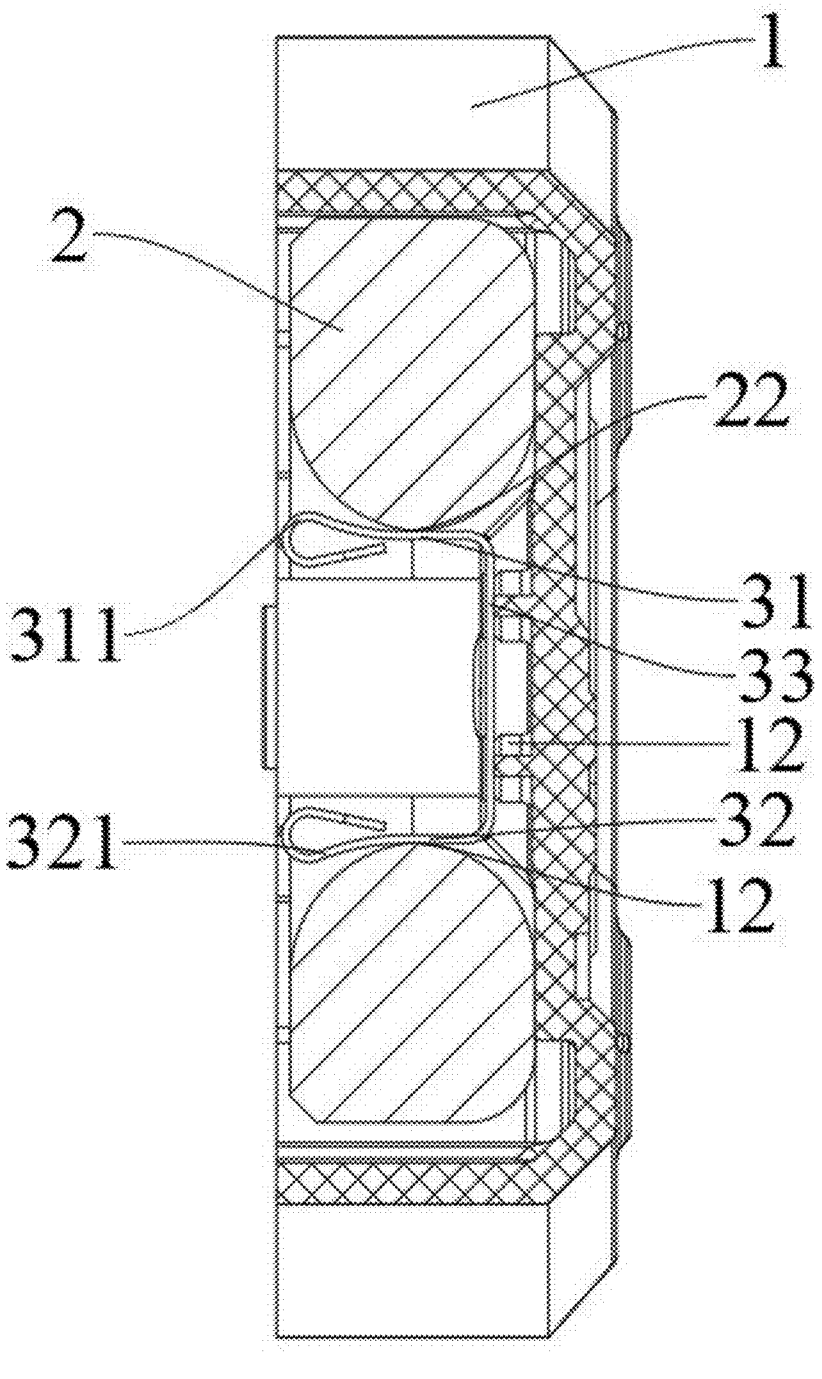
FIG. 3 is a second sectional view of a plug-in rope guide protective shell according to some embodiments of the present technology.

Specifically, as shown in FIGS. 1 to 3, a wall surface enclosing and defining the guide opening 21 includes the first abutting surface 22 and the second abutting surface 23 spaced apart in the up-down direction. The first abutting surface 22 is located above the second abutting surface 23, and the guide opening 21 is located between the first abutting surface 22 and the second abutting surface 23.

It may be understood that the first abutting surface and the second abutting surface are not limited to the wall surface defining the guide opening. In other embodiments, the wall surface defining the guide opening may be provided with two abutting parts extending in the up-down direction, and the two abutting parts are spaced apart in the up-down direction. An upper end face of the abutting part located below is the second abutting surface, and a lower end face of the abutting part located above is the first abutting surface.

The plug-in member 3 includes a first plug-in part 31 and a second plug-in part 32 spaced apart in the second direction. The first plug-in part 31 and the second plug-in part 32 can move relative to each other to provide a movable position and a connection position. In the connection position, the first abutting surface 22 abuts against the first plug-in part 31, and the second abutting surface 23 abuts against the second plug-in part 32. In the movable position, the first abutting surface 22 is separated from the first plug-in part 31, and the second abutting surface 23 is separated from the second plug-in part 32.

Specifically, as shown in FIGS. 1 to 3, the first plug-in part 31 and the second plug-in part 32 both extend in a front-back direction. In some embodiments, the first plug-in part 31 and the second plug-in part 32 are sheet-shaped. The first plug-in part 31 and the second plug-in part 32 are spaced apart in the up-down direction, and the first plug-in part 31 is located above the second plug-in part 32. The first plug-in part 31 and the second plug-in part 32 can move towards or away from each other to result in the movable position and the connection position.

In the connection position, the first abutting surface 22 abuts against the first plug-in part 31 and the second abutting surface 23 abuts against the second plug-in part 32 so that the first plug-in part 31 and the second plug-in part 32 are inserted in the guide opening 21 and the plug-in member 3 will not come out of the guide opening 21 due to the friction between the first abutting surface 22 and the first plug-in part 31 and the friction between the second abutting surface 23 and the second plug-in part 32.

In the movable position, the first abutting surface 22 is separated from the first plug-in part 31, and the second abutting surface 23 is separated from the second plug-in part 32 so that the first plug-in part 31 and the second plug-in part 32 can be inserted into or detached from the guide opening 21 in the front-rear direction.

It may be understood that the first plug-in part and the second plug-in part are not limited to the shape of a sheet, and in other embodiments, the first plug-in part and the second plug-in part are rod-shaped.

In some embodiments, the first plug-in part 31 has a first engaging portion 311 at an end in the first direction, and the second plug-in part 32 has a second engaging portion 321 at an end in the first direction. Both the first engaging portion 311 and the second engaging portion 321 extend in the second direction. In the connection position, a distance between an outer wall surface of the first engaging portion 311 and an outer wall surface of the second engaging portion 321 in the second direction is greater than or equal to a distance between the first abutting surface 22 and the second abutting surface 23 in the second direction.

As shown in FIGS. 1 to 3, a front end of the first plug-in part 31 is bent into an arc shape around a left-right direction to form the first engaging portion 311, and a size of the first engaging portion 311 in the up-down direction is greater than a thickness of a sheet-shaped body at a rear end of the first plug-in part 31 in the up-down direction. A front end of the second plug-in part 32 is bent into an arc shape around the left-right direction to form the second engaging portion 321, and a size of the second engaging portion 321 in the up-down direction is greater than a thickness of a sheet-shaped body at a rear end of the second plug-in part 32 in the up-down direction.

The outer wall surface of the first engaging portion 311 is a wall surface facing away from the second plug-in part 32—that is, the outer wall surface of the first engaging portion 311 is an upper end face. The outer wall surface of the second engaging portion 321 is a wall surface facing away from the first plug-in part 31—that is, the outer wall surface of the second engaging portion 321 is a lower end face.

In the connection position, the distance between the outer wall surface of the first engaging portion 311 and the outer wall surface of the second engaging portion 321 in the up-down direction is greater than or equal to the distance between the first abutting surface 22 and the second abutting surface 23 in the up-down direction so that the first engaging portion 311 is configured to abut against the first abutting surface 22 and the second engaging portion 321 is configured to abut against the second abutting surface 23. Thus, the plug-in member 3 can be engaged with the rope guide 2, further improving the connection stability of the plug-in rope guide protective shell and the rope guide.

It may be understood that the structures of the first engaging portion and the second engaging portion are not limited to the annular structure formed by bending the sheet-shaped body, and in other embodiments, the first engaging portion and the second engaging portion may be spherical, triangular, or trapezoidal.

In some embodiments, the outer wall surface of the first engaging portion 311 is arc-shaped and convex towards the first abutting surface 22, and the outer wall surface of the second engaging portion 321 is arc-shaped and convex towards the second abutting surface 23.

As shown in FIG. 2 and FIG. 3, the outer wall surface of the first engaging portion 311 is arc-shaped and convex upwards, and the outer wall surface of the second engaging portion 321 is arc-shaped and convex downwards. When the first plug-in part 31 and the second plug-in part 32 move forwards to insert into the guide opening 21, the arc-shaped outer wall surface of the first engaging portion 311 abuts against the first abutting surface 22 to make the first engaging portion 311 move downwards and the arc-shaped outer wall surface of the second engaging portion 321 abuts against the second abutting surface 23 to make the second engaging portion 321 move upwards so that the first plug-in portion 31 and the second plug-in portion 32 move towards each other to enter the guide opening 21, thus preventing the first engaging portion 311 and the second engaging portion 321 from being stopped by a rear end face of the rope guide 2 and being unable to be inserted into the guide opening 21.

In some embodiments, the first abutting surface 22 is arc-shaped and convex towards the second abutting surface 23, and the second abutting surface 23 is arc-shaped and convex towards the first abutting surface 22. In the connection position, the distance between the outer wall surface of the first engaging portion 311 and the outer wall surface of the second engaging portion 321 in the second direction is greater than or equal to the minimum distance between the first abutting surface 22 and the second abutting surface 23.

As shown in FIGS. 2 and 3, the first abutting surface 22 is arc-shaped and convex downwards, and the second abutting surface 23 is arc-shaped and convex upwards. A distance between a middle portion of the first abutting surface 22 in the front-back direction and a middle portion of the second abutting surface 23 in the front-back direction is the minimum distance between the first abutting surface 22 and the second abutting surface 23.

In the connection position, the first engaging portion 311 is located at a front side of the middle portion of the first abutting surface 22 in the front-back direction, the rear end of the first plug-in part 31 abuts against the middle portion of the first abutting surface 22 in the front-back direction, the second engaging portion 321 is located at a front side of the middle portion of the second abutting surface 23 in the front-back direction, the rear end of the second plug-in part 32 abuts against the middle portion of the second abutting surface 23 in the front-back direction, and the distance between the outer wall surface of the first engaging portion 311 and the outer wall surface of the second engaging portion 321 in the up-down direction is greater than or equal to the minimum distance between the first abutting surface 22 and the second abutting surface 23 so that the plug-in member 3 is engaged in the guide opening 21. In this case, the arc-shaped outer wall surface of the first engaging portion 311 and the arc-shaped outer wall surface of the second engaging portion 321 are also configured to facilitate the first plug-in part 31 and the second plug-in part 32 to move towards each other while the first engaging portion 311 and the second engaging portion 321 move backwards.

The first abutting surface 22 and the second abutting surface 23 are arc-shaped, which also facilitates the first plug-in part 31 and the second plug-in part 32 to move towards each other so that the first plug-in part 31 and the second plug-in part 32 can enter or exit the guide opening 21.

It may be understood that the structures of the first abutting surface, the second abutting surface, the first engaging portion, and the second engaging portion are not limited to those shown in FIGS. 2 and 3. In other embodiments, the first abutting surface and the second abutting surface are arc-shaped, and the outer wall surface of the first engaging portion and the outer wall surface of the second engaging portion are flat; or the first abutting surface and the second abutting surface are flat, and the outer wall surface of the first engaging portion and the outer wall surface of the second engaging portion are arc-shaped. When the first abutting surface and the second abutting surface are flat, the first abutting surface and the second abutting surface are the end faces of the abutting parts, and the size of the abutting part in the front-back direction is smaller than that of the rope guide in the front-back direction. When the first engaging portion and the second engaging portion are engaged in the guide opening, the first engaging portion and the second engaging portion are located at front sides of the corresponding abutting parts, respectively.

In some embodiments, the plug-in member 3 further includes a connecting part 33 connected between another end of the first plug-in part 31 and another end of the second plug-in part 32, and the connecting part 33 is connected with the inner wall surface of the shell body 1.

As shown in FIGS. 1-3, the plug-in member 3 further includes a connecting part 33. In some embodiments, the connecting part 33 is sheet-shaped and extends in the up-down direction. An upper end of the connecting part 33 is connected with the rear end of the first plug-in part 31, a lower end of the connecting part 33 is connected with the rear end of the second plug-in part 32, and the connecting part 33 is connected with the inner wall surface of the shell body 1.

It may be understood that the structure of the plug-in member is not limited to that shown in FIG. 1, and in other embodiments, the first plug-in part and the second plug-in part are directly connected with the inner wall surface of the shell body.

In some embodiments, the connecting part 33, the first plug-in part 31, and the second plug-in part 32 are integrated as an elastic sheet.

In some embodiments, the clastic sheet may be a metal elastic sheet or a plastic elastic sheet to provide elasticity between the first plug-in part 31 and the connecting part 33 and to provide elasticity between the second plug-in part 32 and the connecting part 33 so that the first plug-in part 31 and the second plug-in part 32 can move towards or away from each other.

It may be understood that the connecting part, the first plug-in part, and the second plug-in part are not limited to an integral structure. In some embodiments, the first plug-in part and the second plug-in part are hinged with the connecting part, respectively, an elastic piece is arranged between the first plug-in part and the connecting part, and another elastic piece is arranged between the second plug-in part and the connecting part; or an elastic piece is arranged between the first plug-in part and the second plug-in part, the elastic piece is configured to drive the first plug-in part and the second plug-in part to move away from each other, and under the press of an external force, the first plug-in part and the second plug-in part can move towards each other.

In some embodiments, the rope guide protective shell in the embodiments of the present technology further includes a connecting piece 4, and the connecting piece 4 detachably connects the connecting part 33 with the shell body 1.

As shown in FIG. 1, the connecting piece 4 detachably connects the connecting part 33 with the shell body 1.

It may be understood that, in other embodiments, the connecting part 33 and the shell body 1 may also be fixedly connected.

In some embodiments, the connecting piece 4 has external threads, the shell body 1 has a base 12 on the inner wall surface, the base 12 has a threaded hole, the connecting part 33 is arranged to the base 12, the connecting piece 4 passes through and is arranged in the connecting part 33 and the threaded hole in sequence, and the threaded hole is adapted to the connecting piece 4—e.g., the connecting piece 4 can be screwed in the threaded hole.

Figure 4:
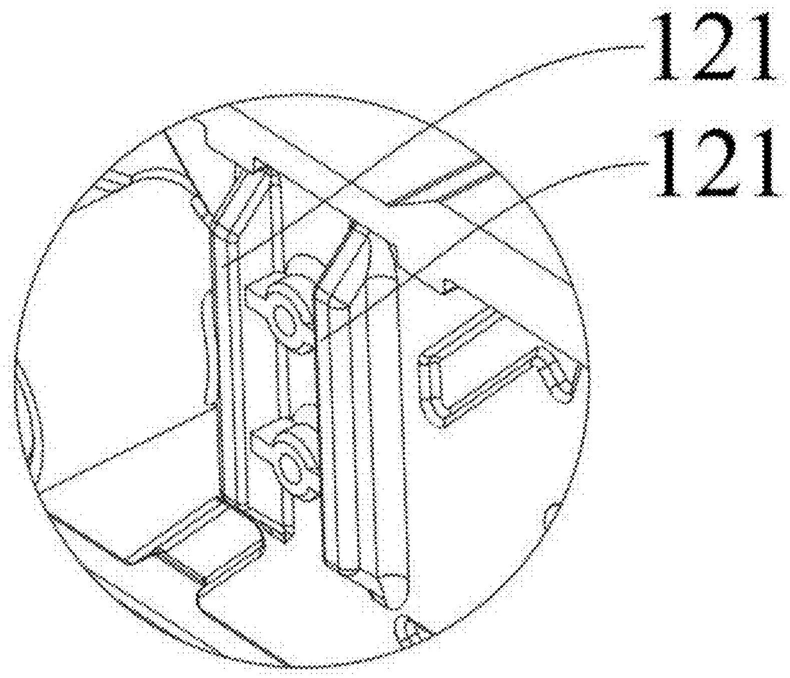
FIG. 4 is an enlarged view of part A in FIG. 1.

As shown in FIGS. 1 and 4, the connecting piece 4 has external threads. In some embodiments, the connecting piece 4 may be a screw or a bolt.

The inner wall surface of the shell body 1 is provided with the base 12 protruding forwards, the base 12 has the threaded hole, the connecting part 33 abuts on a front end face of the base 12, the connecting piece 4 passes through and is arranged in the connecting part 33 and the threaded hole in sequence, and the threaded hole is adapted to the connecting piece 4 so that the connecting part 33 and the shell body 1 can be detachably connected through the connecting piece 4.

It may be understood that the connecting piece is not limited to having external threads, and in other embodiments, the connecting piece may be a buckle arranged on the inner wall surface of the shell body, and the connecting piece is arranged around the base to engage the connecting piece with the base through the connecting piece.

In some embodiments, the base 12 has at least two limiting parts 121 protruding along the first direction, the at least two limiting parts 121 are spaced apart in a third direction (the left-right direction as shown in FIG. 1), and the connecting part 33 is arranged between two adjacent limiting parts 121. The third direction is orthogonal to the first direction and the second direction.

As shown in FIGS. 1 and 4, corresponding limiting parts 121 are arranged at left and right ends of the base 12, respectively, the limiting part 121 protrudes forwards, is strip-shaped, and extends in the up-down direction, and the connecting part 33 is arranged between the two limiting parts 121 so as to limit a position of the connecting part 33 through the two limiting parts 121 and prevent the connecting part 33 from moving and rotating.

In some embodiments, the guide opening 21 is strip-shaped and extends in the left-right direction, at least two plug-in members 3 are provided, and the at least two plug-in members 3 are spaced apart in the left-right direction.

EXAMPLES

In some embodiments in accordance with the present technology (example 1), a plug-in rope guide protective shell includes a shell body having an inner cavity for accommodating a rope guide, the rope guide having a guide opening penetrating the rope guide in a first direction; and a plug-in member connected to the shell body and arranged in the inner cavity of the shell body, the plug-in member being configured to be inserted in the guide opening.

Example 2 includes the plug-in rope guide protective shell of example 1 or any of examples 1-10, wherein the rope guide has a first abutting surface and a second abutting surface spaced apart in a second direction orthogonal to the first direction, and at least part of the guide opening is located between the first abutting surface and the second abutting surface; and the plug-in member comprises a first plug-in part and a second plug-in part spaced apart in the second direction, the first plug-in part and the second plug-in part are configured to move relative to each other to provide a movable position and a connection position, wherein, in the connection position, the first abutting surface abuts against the first plug-in part and the second abutting surface abuts against the second plug-in part, and wherein, in the movable position, the first abutting surface is separated from the first plug-in part and the second abutting surface is separated from the second plug-in part.

Example 3 includes the plug-in rope guide protective shell of example 2 or any of examples 1-10, wherein the first plug-in part comprises a first engaging portion at an end in the first direction, the second plug-in part comprises a second engaging portion at an end in the first direction, the first engaging portion and the second engaging portion extend in the second direction, and in the connection position, a distance between an outer wall surface of the first engaging portion and an outer wall surface of the second engaging portion in the second direction is greater than or equal to a distance between the first abutting surface and the second abutting surface in the second direction.

Example 4 includes the plug-in rope guide protective shell of example 3 or any of examples 1-10, wherein the outer wall surface of the first engaging portion is arc-shaped and convex towards the first abutting surface, and the outer wall surface of the second engaging portion is arc-shaped and convex towards the second abutting surface.

Example 5 includes the plug-in rope guide protective shell of example 3 or any of examples 1-10, wherein the first abutting surface is arc-shaped and convex towards the second abutting surface, the second abutting surface is arc-shaped and convex towards the first abutting surface, and in the connection position, the distance between the outer wall surface of the first engaging portion and the outer wall surface of the second engaging portion in the second direction is greater than or equal to a minimum distance between the first abutting surface and the second abutting surface.

Example 6 includes the plug-in rope guide protective shell of example 3 or any of examples 1-10, wherein the plug-in member further comprises a connecting part connected between another end of the first plug-in part and another end of the second plug-in part, and the connecting part is connected with an inner wall surface of the shell body.

Example 7 includes the plug-in rope guide protective shell of example 6 or any of examples 1-10, further comprising a connection piece, wherein the connection piece detachably connects the connecting part with the shell body.

Example 8 includes the plug-in rope guide protective shell of example 7 or any of examples 1-10, wherein the connection piece has external threads, the shell body has a base on the inner wall surface, the base has a threaded hole, the connecting part is arranged to the base, the connection piece passes through and is arranged in the connecting part and the threaded hole in sequence, and the threaded hole is adapted to the connection piece.

Example 9 includes the plug-in rope guide protective shell of example 8 or any of examples 1-10, wherein the base has at least two limiting parts protruding along the first direction, the at least two limiting parts are spaced apart in a third direction, and the connecting part is arranged between two adjacent limiting parts, wherein the third direction is orthogonal to the first direction and the second direction.

Example 10 includes the plug-in rope guide protective shell of example 6 or any of examples 1-9, wherein the connecting part, the first plug-in part, and the second plug-in part are integrated as an elastic sheet.

CONCLUSION

In the description of the present disclosure, it should be understood that terms such as “central,” “up,” “down,” “front,” “rear,” “left,” “right,” “inner,” and “outer” should be construed to refer to the orientation or position as shown in the drawings, and these relative terms are only for convenience and simplification of description rather than indicating or implying that the referred device or element must have a particular orientation and be constructed and operated in a particular orientation and, therefore, should not be construed as limiting the present technology.

In addition, terms such as “first” and “second” are used herein for purposes of description and are not intended to indicate or imply relative importance or significance or implicitly indicate the number of technical features indicated. Therefore, the feature defined as “first” or “second” may explicitly or implicitly include at least one such feature. In the description of the present disclosure, “a plurality of” means at least two, such as two, three, etc., unless specified or limited otherwise.

In the present disclosure, unless specified or limited otherwise, the terms “mount,” “couple,” “connect,” and “fix” should be broadly understood—for example, they may refer to the fixed connection, the detachable connection, or the integration; they may refer to the mechanical connection, the electrical connection, or the mutual communication; they may refer to the direct connection or the indirect connection through the intermediate medium; and they may refer to the internal communication of two elements or the interaction between two elements unless specified otherwise. For those of ordinary skill in the art, the specific meanings of the above terms in the present disclosure may be understood according to specific situations.

In the present disclosure, unless specified or limited otherwise, a structure in which a first feature is “on” or “below” a second feature may include an embodiment in which the first feature directly contacts the second feature and may also include an embodiment in which the first feature indirectly contacts the second feature through an intermediate medium. Furthermore, a first feature “on,” “above,” or “on top of” a second feature may include an embodiment in which the first feature is right “on,” “above,”

or "on top of" the second feature and may also include an embodiment in which the first feature is obliquely "on," "above," or "on top of" the second feature, or it just means that the first feature is at a height higher than that of the second feature. A first feature "beneath," "below," or "on bottom of" a second feature may include an embodiment in which the first feature is right "beneath," "below," or "on bottom of" the second feature and may also include an embodiment in which the first feature is obliquely "beneath," "below," or "on bottom of" the second feature, or it just means that the first feature is at a height lower than that of the second feature.

In the present disclosure, the terms "one embodiment," "some embodiments," "examples," "specific examples," or "some examples" etc. mean that the specific features, structures, materials, or characteristics described in connection with this embodiment or example are included in at least one embodiment or example of the present technology. In this specification, the schematic expressions of the above terms are not necessarily aimed at the same embodiment or example. Moreover, the specific features, structures, materials, or characteristics described may be combined in any one or more embodiments or examples in a suitable manner. In addition, those skilled in the art can combine and group different embodiments or examples and features of different embodiments or examples described in this specification without mutual contradiction.

Although the above embodiments have been shown and described, it would be understood that the above embodiments are illustrative and cannot be construed to limit the present technology, and changes, modifications, alternatives, and variants of the above embodiments made by those of ordinary skill in the art fall within the scope of protection of the present technology.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A plug-in rope guide protective shell, comprising:

a shell body having an inner cavity for accommodating a rope guide, the rope guide having a guide opening penetrating the rope guide in a first direction; and a plug-in member connected to the shell body and arranged in the inner cavity of the shell body, the plug-in member being configured to be inserted in the guide opening.

2. The plug-in rope guide protective shell according to claim 1, wherein the rope guide has a first abutting surface and a second abutting surface spaced apart in a second direction orthogonal to the first direction, and at least part of the guide opening is located between the first abutting surface and the second abutting surface; and wherein the plug-in member comprises a first plug-in part and a second plug-in part spaced apart in the second direction, the first plug-in part and the second plug-in part are configured to move relative to each other to provide a movable position and a connection position, wherein, in the connection position, the first abutting surface abuts against the first plug-in part and the second abutting surface abuts against the second plug-in part, and wherein, in the movable position, the first abutting surface is separated from the first plug-in part and the second abutting surface is separated from the second plug-in part.

3. The plug-in rope guide protective shell according to claim 2, wherein the first plug-in part comprises a first engaging portion at an end in the first direction, the second plug-in part comprises a second engaging portion at an end in the first direction, the first engaging portion and the second engaging portion extend in the second direction, and in the connection position, a distance between an outer wall surface of the first engaging portion and an outer wall surface of the second engaging portion in the second direction is greater than or equal to a distance between the first abutting surface and the second abutting surface in the second direction.

4. The plug-in rope guide protective shell according to claim 3, wherein the outer wall surface of the first engaging portion is arc-shaped and convex towards the first abutting surface, and the outer wall surface of the second engaging portion is arc-shaped and convex towards the second abutting surface.

5. The plug-in rope guide protective shell according to claim 3, wherein the first abutting surface is arc-shaped and convex towards the second abutting surface, the second abutting surface is arc-shaped and convex towards the first abutting surface, and in the connection position, the distance between the outer wall surface of the first engaging portion and the outer wall surface of the second engaging portion in the second direction is greater than or equal to a minimum distance between the first abutting surface and the second abutting surface.

6. The plug-in rope guide protective shell according to claim 3, wherein the plug-in member further comprises a connecting part connected between another end of the first plug-in part and another end of the second plug-in part, and the connecting part is connected with an inner wall surface of the shell body.

7. The plug-in rope guide protective shell according to claim 6, further comprising a connection piece, wherein the connection piece detachably connects the connecting part with the shell body.

8. The plug-in rope guide protective shell according to claim 7, wherein the connection piece has external threads, the shell body has a base on the inner wall surface, the base has a threaded hole, the connecting part is arranged to the base, the connection piece passes through and is arranged in the connecting part and the threaded hole in sequence, and the threaded hole is adapted to the connection piece.

9. The plug-in rope guide protective shell according to claim 8, wherein the base has at least two limiting parts protruding along the first direction, the at least two limiting parts are spaced apart in a third direction, and the connecting part is arranged between two adjacent limiting parts, wherein the third direction is orthogonal to the first direction and the second direction.

10. The plug-in rope guide protective shell according to claim 6, wherein the connecting part, the first plug-in part, and the second plug-in part are integrated as an elastic sheet.

* * * * *